(No Model.) 3 Sheets—Sheet 1.

C. R. REID.
SEED PLANTER AND FERTILIZER DISTRIBUTER.

No. 399,559. Patented Mar. 12, 1889.

Witnesses:
E. P. Ellis
Allen S. Pattison

Inventor:
C. R. Reid,
per F. A. Lehmann,
Atty.

(No Model.) 3 Sheets—Sheet 2.

C. R. REID.
SEED PLANTER AND FERTILIZER DISTRIBUTER.

No. 399,559. Patented Mar. 12, 1889.

Witnesses:
E. P. Ellis,
Allen S. Pattison

Inventor:
C. R. Reid,
per F. A. Lehmann,
atty.

(No Model.) 3 Sheets—Sheet 3.

C. R. REID.
SEED PLANTER AND FERTILIZER DISTRIBUTER.

No. 399,559. Patented Mar. 12, 1889.

UNITED STATES PATENT OFFICE.

CHARLIE RUFUS REID, OF HEIDELBERG, MISSISSIPPI.

SEED-PLANTER AND FERTILIZER-DISTRIBUTER.

SPECIFICATION forming part of Letters Patent No. 399,559, dated March 12, 1889.

Application filed October 27, 1888. Serial No. 289,313. (No model.)

*To all whom it may concern:*

Be it known that I, CHARLIE RUFUS REID, of Heidelberg, in the county of Jasper and State of Mississippi, have invented certain new and useful Improvements in Seed-Planters and Fertilizers; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters and fertilizers; and it consists in, first, the combination of a suitable frame, which is supported upon a wheel at one end, a mechanism for operating the stirrer or fertilizer-distributer, a swinging hopper, a driving-chain, which extends from the axle over and around two of the operating-shafts journaled in the hopper, and fastening devices for holding the hopper in an operative position, so that when the machine is moved forward the contents of the hopper will be both stirred and dropped to the ground as the machine is moved along; second, the combination, with the frame, of a seed-planter or fertilizer-distributer, which is supported upon a single wheel as it is moved along, and a vertically-adjustable wheel which serves as a pivot upon which the machine is turned when the end of the row is reached, as will be more fully described hereinafter.

The object of my invention is to provide a seed-planter which is forced ahead of the operator like a wheelbarrow, and in which the hopper is pivoted, so that its operating mechanism can be thrown out of gear when so desired, and to provide the frame with an adjustable means by which the planter can be swung around at any time by depressing the handles and bringing the weight of the machine upon a wheel which is provided for that purpose.

Figure 1:
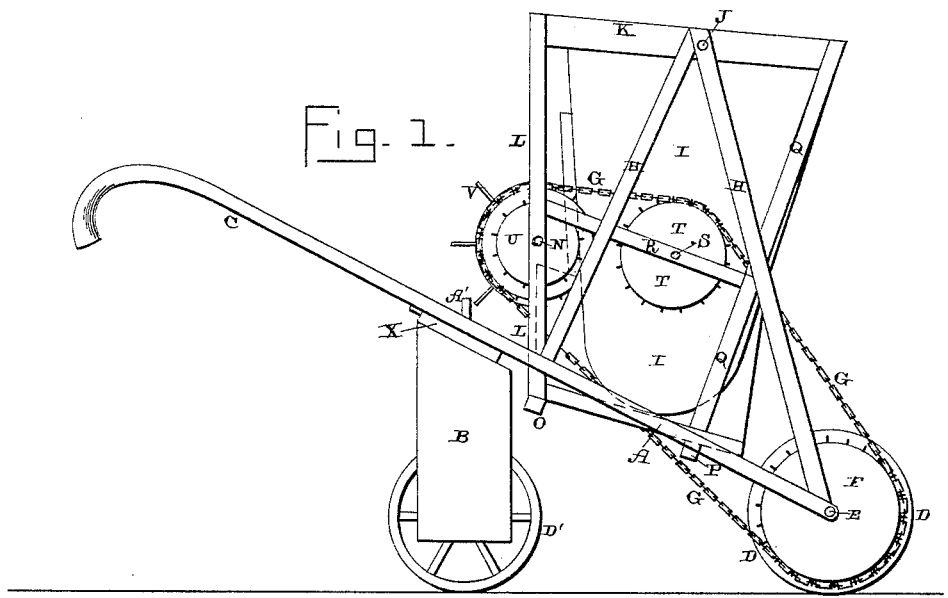
Figure 2:
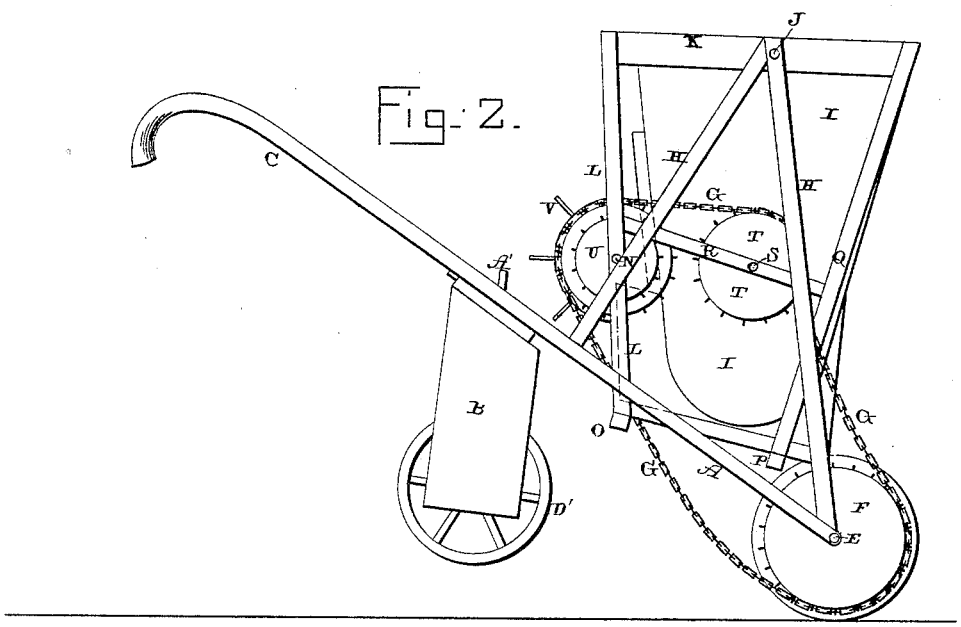
Figure 3:
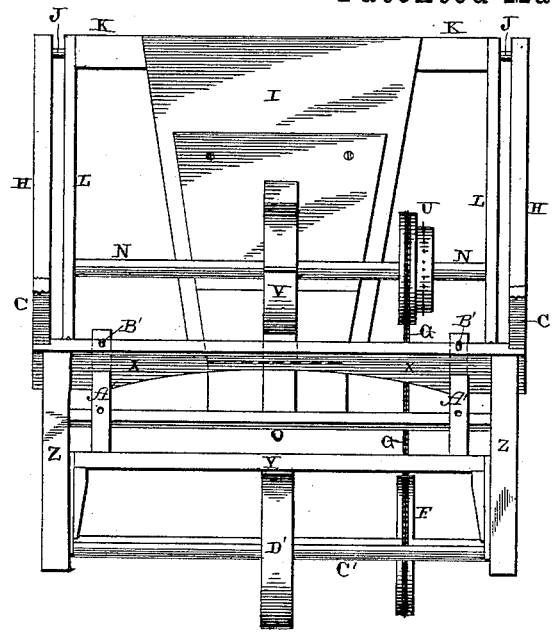
Figure 4:
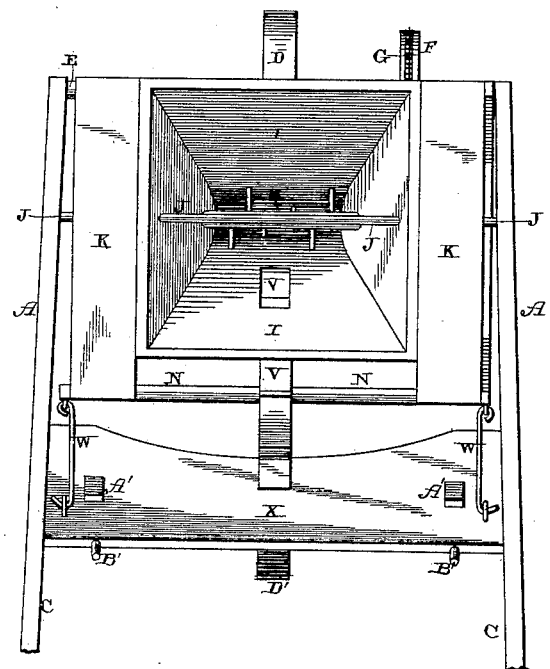
Figure 5:
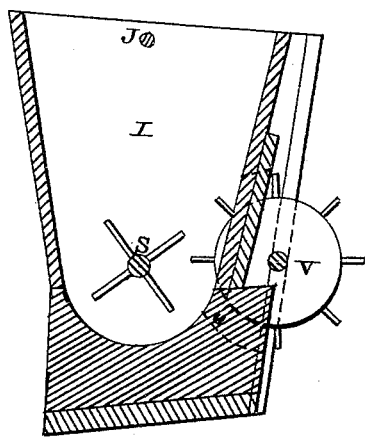

Figure 1 is a side elevation of a machine which embodies my invention complete, the hopper being shown in an operative position. Fig. 2 is a similar view showing the parts raised up and the machine ready to be turned around and the hopper out of operative position. Fig. 3 is an end view. Fig. 4 is a plan view. Fig. 5 is a vertical section taken through the hopper alone.

A represents a rectangular frame, which is provided with the two legs B, and from which the handles C project like the handles of a wheelbarrow. This frame is supported upon the wheel D, which is rigidly secured to the axle E, which is journaled in one end of the frame. Also rigidly secured to the axle E is a sprocket or spur wheel, F, around which the driving-chain G passes for the purpose of communicating the motion of the axle to the operating parts connected with the hopper. Rising from the top of the frame A, upon each side, is the triangular-shaped support H, in the upper end of which the hopper I is journaled. This hopper is supported entirely at its upper end by the pivotal rod J, which passes through it, so that the hopper can swing back and forth in relation to the axle E, to throw the operating parts in or out of gear, as may be desired. Projecting downward from the side pieces, K, which are secured to the upper and opposite ends of the hopper, are the supporting rods or hangers L, which both form supports or bearings for the shaft N and to support the braces and the lower part of the hopper in position. The lower ends of these hangers L are connected together by the cross-piece O, which extends across under the hopper and upon which the hopper rests. Also placed under the hopper nearer the front end of the machine is a second cross-piece, P, which also extends across under the hopper, and is secured at one end to another hanger, Q, which projects downward from the front end of one of the side pieces K. Two of the hangers, L Q, at one end of the frame are connected together by a cross-piece, R, which forms the bearing for the outer end of the operating-shaft S, which extends through the hopper and has the stirring device secured to it. Upon this shaft S is placed a wheel, T, with which the operating-chain G also engages, so as to keep the stirrer in motion while the machine is moving forward.

Secured to the shaft N in a line with the wheel T is a second wheel, U, around which the operating-chain also passes for the purpose of operating the seed or fertilizer distributer V. The wheel U is made removable from the shaft N, so that a smaller or larger one can be used, as may be desired, for the purpose of giving a greater or less speed to the shaft N, and thus plant a larger or smaller quantity of grain. The smaller the wheel the larger the quantity of seed planted.

The fertilizer-distributer V may either have solid blades projecting rigidly from its periphery or prongs, as may be desired. If cotton-seeds are to be planted, then the prongs will be used; but in case the fertilizer is to be distributed solid blades will be used. This distributer V extends through a slot in the rear part of the hopper, and as it revolves it forces out the contents of the hopper upon the ground.

When it is desired to throw the operating mechanism out of gear, as when the machine is being moved to and from the field, the hooks W, fastened to the lower part of the hopper, are disconnected from the staples on top of the cross-bar X, which forms a part of the frame A, and then the whole lower portion of the hopper swings toward the wheel D and loosens the operating-chain upon the wheels to such an extent that the parts are at once stopped. When it is desired to operate the parts, it is only necessary to move the lower portion of the hopper toward the bar X and then fasten the hooks W in the staples, when the chains will be tightened, so as to throw the parts into operation once more.

To provide a means for swinging the machine around in order to change the direction of its movement, as when the end of a row is reached, a vertically-adjustable frame, Y, is used, and this frame Y is placed in suitable grooves which are formed on the inner sides of the two legs Z. Projecting from the top of the frame Y are two perforated projections, A', which pass up through openings in the cross-bar X, and through which the pins B' are passed for the purpose of supporting the frame in any desired position. Journaled in the lower end of this frame Y is an axle, C', to which is rigidly secured the wheel D', which may support the rear end of the machine as it is moved along, and at the same time act as a fulcrum upon which the weight of the whole machine is thrown when the operator bears down upon the handles for this purpose. By means of this wheel the operator can swing the machine around within its own length when the end of the row is reached, or at any other point, without having to walk around in a circle, as would otherwise be the case, and thus make it impossible or difficult to turn close to a fence.

Having thus described my invention, I claim—

1. The combination of a suitable frame, supporting-braces which extend therefrom, a hopper pivoted in these supporting-braces so as to have a swinging movement at its lower end, the shaft which passes through or into the hopper, and which is provided with operating-wheels, an operating-chain for passing around these wheels, an operating-axle provided with a supporting-wheel, and a wheel for operating the chain, and hooks or other devices for holding the hopper in an operative position, substantially as shown.

2. The combination of the main frame, a supporting-wheel, the axle to which the wheel is secured, and which is provided with an operating-wheel for the chain, a hopper which is pivoted at its upper end, so that its lower end will have a swinging movement, a shaft provided with an operating-wheel for engaging with the chain, a stirring device located inside of the hopper, a second shaft, also provided with an operating-wheel and a device for distributing the seed or fertilizer, and hooks or other devices for holding the lower portion of the hopper in an operative position, substantially as described.

3. The combination of the main frame provided with handles, the axle provided with a supporting-wheel at one end, the supporting-legs at the opposite end of the frame, and a vertically-adjustable frame provided with a fulcrum or bearing by means of which the entire planter can be swung around within its own length, substantially as set forth.

4. The combination of the main frame provided with handles, the front axle provided with a supporting and operating wheel, the legs Z, a vertically-adjustable frame, Y, the axle C', journaled in the said frame, and the wheel D', substantially as specified.

In testimony whereof I affix my signature in presence of two witnesses.

CHARLIE RUFUS REID.

Witnesses:
N. A. GASTON,
E. D. TRAVIS.